United States Patent [19]
Darko

[11] 3,723,624
[45] Mar. 27, 1973

[54] 2-HYDROXY AND 2-CARBAMYLOXY DERIVATIVES OF 1,1,1-TRICHLORO-3-CARBAMYLOXYALKANES IN A COMPOSITION AND METHOD FOR EFFECTING MUSCLE RELAXATION

[75] Inventor: Laszlo L. Darko, Yorktown Heights, N.Y.

[73] Assignee: Ciba-Geigy Corporation, Ardsley, N.Y.

[22] Filed: June 29, 1970

[21] Appl. No.: 158,112

Related U.S. Application Data

[60] Division of Ser. No. 25,282, April 2, 1970, Pat. No. 3,639,453, which is a continuation-in-part of Ser. No. 786,750, Dec. 24, 1968, abandoned.

[52] U.S. Cl. ................................................424/300
[51] Int. Cl. ............................................A61k 27/00
[58] Field of Search ...................................424/300

*Primary Examiner*—Stanley J. Friedman
*Attorney*—Karl F. Jorda et al.

[57] ABSTRACT

1,1,1-Trichloro-2-HYDROXY-3-carbamyloxyalkanes and their 2-carbamyloxy derivatives such as 1,1,1-trichloro-2-hydroxy-3-carbamyloxypropane, 1,1,1-trichloro-2-hydroxy-3-carbamyloxybutane and 1,1,1-trichloro-2,3-dicarbamyloxybutane are depressants of the central nervous system and useful as muscle relaxants.

2 Claims, No Drawings

2-HYDROXY AND 2-CARBAMYLOXY DERIVATIVES OF 1,1,1-TRICHLORO-3-CARBAMYLOXYALKANES IN A COMPOSITION AND METHOD FOR EFFECTING MUSCLE RELAXATION

CROSS REFERENCE

This is a divisional of Ser. No. 25,282, filed Apr. 2, 1970, now U.S. Pat. No. 3,639,453, which in turn is a continuation in part of Ser. No. 786,750, filed Dec. 24, 1968, now abandoned.

DETAILED DESCRIPTION

The present invention pertains to a class of organic compounds, to a process for their preparation and to compositions and methods for their use. This class of organic compounds can be characterized as 1,1,1-trichloro-2-hydroxy-3-carbamyloxyalkanes and the 2-carbamyloxy derivatives thereof and graphically depicted by the following structural formula:

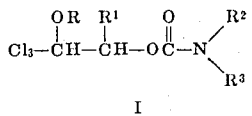

I wherein R is hydrogen or the group

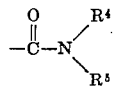

and each of $R^1$, $R^2$, $R^3$, $R^4$ and $R^5$ is hydrogen or (lower)alkyl.

By the term (lower)alkyl is intended a branched or straight chained hydrocarbon group of from one to six carbon atoms, such as methyl, ethyl, propyl, isopropyl, butyl, hexyl and the like, preferably methyl or ethyl.

These 1,1,1-trichloro-2-hydroxy-3-carbamyloxyalkanes and 1,1,1-trichloro-2,3-dicarbamyloxyalkanes possess central nervous system depressant properties, in particular the ability to relax skeletal muscles. They are accordingly useful to relieve muscle spasms of various origins in animals, as for example in sprains, bursitis, chorea and the like. Although the amount given to an animal will depend upon its size, species response, condition, and response desired, generally a dose from about 1 to about 50 mg/kg of body weight is employed.

The following description of using and making the invention represents the best modes presently contemplated for carrying out the invention. When employed as muscle relaxants, the compounds of the present invention are incorporated in compositions suitable for oral administration to animals in solid and liquid unit dosage forms, such as tablets, capsules, powders, granules, syrups, elixirs, and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a 1,1,1-trichloro-3-carbamyloxyalkane to a suitably fine size and mixing with a similarly comminuted diluent. The diluent can be an edible carbohydrate material such as starch. A sweetening agent or sugar may also be present as well as flavoring oil.

Granules for reconstitution into a liquid oral preparation are prepared utilizing water-soluble diluents. A powder mixture of finely divided 1,1,1-trichloro-3-carbamyloxyalkane and a water-soluble diluent such as sucrose, glucose, and the like, is wetted with a binder such as acacia mucilage, gelatin solution, methylcellulose solution and forced through a screen to form granules which are allowed to dry. A suspending agent such as tragacanth may be included in the composition.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by granulating or slugging a powder mixture as described above, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen or, as an alternative to granulating, the powder mixture is run through the tablet machine and the resulting imperfectly formed tablets broken into slugs. The slugs may be lubricated to prevent sticking to the tablet forming dies by means of the addition of a substance such as stearic acid a stearate salt, talc or mineral oil. The lubricating mixture is then compressed into tablets. A protective coating consisting of a sealing coat of shellac, a coating of sugar and methylcellulose, and a polish coating of wax such as carnauba may be provided.

Oral fluids are prepared in unit dosage forms such as syrups and elixirs wherein each teaspoonful of composition contains a predetermined amount of the compound for administration. A syrup is prepared by suspending a 1,1,1-trichloro-3-carbamyloxyalkane in a suitably flavored aqueous sucrose solution while an elixir is prepared utilizing instead a nontoxic alcohol vehicle.

Aqueous and oleaginous fluid unit dosage forms can be prepared for parenteral administration. In preparing the parenteral form, a measured amount of the compound is placed in a vial and the vial and its contents sterilized and sealed. An accompanying vial of sterile water may be provided as a vehicle to form a suspension prior to administration.

The compounds of the present invention wherein R is hydrogen are prepared through treatment of a 1,1,1-trichloro-2,3-dihydroxyalkane of Formula II with a carbamyl chloride of Formula III:

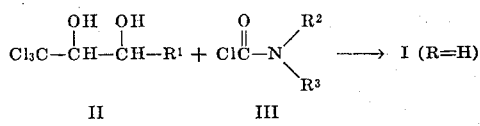

II  III

In the foregoing, $R^1$, $R^2$ and $R^3$ are as previously defined. The reaction is easily executed through mixing the two reactants in an inert organic solvent such as ethyl ether, benzene, toluene, pyridine or the like and heating this mixture at temperatures up to about 100° C. Alternatively phosgene and an amine of the formula:

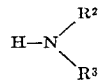
IV

, which together represent the functional equivalent of the above carbamyl chloride of Formula III, can be used.

The desired product is isolated through conventional techniques such as concentration with any unreacted starting material being removed through solvent extraction as with water, carbon tetrachloride or the like. The product is purified through recrystallization, chromatography or the like.

In the case of those compounds of Formula I wherein R is the group

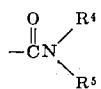

, a 1,1,1-trichloro-2-hydroxy-3-carbamyloxy derivative of Formula I is first treated with Grignard reagent. This intermediate is then treated with phosgene followed by ammonia or an amine of the formula:

V

The starting materials of Formula II are either known or may be readily prepared. In one synthesis, a substituted propargyl alcohol of the formula $CH\equiv CCHOHR^1$ is treated with mercuric acetate and the resultant mercuric acetate complex is then chlorinated to yield a 1,1,1-trichloro-3-acetoxyalkan-2-one which upon reduction yields the corresponding compound of Formula II.

The compounds of the present invention possess at least one carbon atom having asymmetric substitution and can therefore be separated into optical isomers. Moreover when $R^1$ is other than hydrogen, isomeric threo and erythro forms are present. These are most conveniently separated in the synthesis of the starting materials of Formula II by utilization of their different physical properties, e.g., through fractional distillation. All such isomeric forms are within the scope of the present invention.

The following Examples will serve to further typify the nature of the present invention without being a limitation on the scope thereof.

PREPARATION 1,1,-Trichlorobutane-2,3-diol

To a suspension of 1.5 moles of mercuric acetate in 1.5 l. of methanol is added 0.5 mole of 3-butyn-2-ol. Upon completion of the addition, heat evolves and the formed complex precipitates. The complex is removed by filtration and suspended in chloroform. Chlorine gas is bubbled through the suspension until refluxing ceases. The reaction mixture is then filtered and the filtrate is washed with 2N hydrochloric acid, saturated sodium bicarbonate solution, sodium thiosulfate solution and water. The washed solution is then dried over magnesium sulfate, filtered and evaporated to a yellow liquid. Distillation at 98° C/8mm yields 1,1,1-trichloro-3-acetoxybutan-2-one.

To 43.5 of lithium aluminum hydride suspended in 2.5 l. of ether are added over an 80 minute period with vigorous stirring 296.85 g (1.27 mole) of 1,1,1-trichloro-3-acetoxybutan-2-one dissolved in 400 ml of anhydrous ether. The addition is controlled so that reflux is maintained at a moderate rate. The reaction mixture is then refluxed for an additional 24 hours. The excess lithium aluminum hydride is then destroyed with ethyl acetate and the reaction mixture poured over ice-cooled solution of diluted acid. The mixture is extracted with ether and the ether extracts are dried over magnesium sulfate, filtered and evaporated. The residue is then fractionally distilled to yield threo 1,1,1-trichlorobutane-2,3-diol, b.p. 72.5° C/1.4 mm and the corresponding erythro isomer, b.p. 76° C/1.2 mm. The products solidify and are further purified through recrystallization, from methylene chloride or chloroform, and fractional sublimation, threo isomer, m.p. 62°–63° C, erythro isomer, m.p. 85.5°–87° C.

EXAMPLE 1

1,1,1-Trichloro-2-hydroxy-3-carbamyloxypropane

To 5.0 g of carbamyl chloride suspended in 60 ml of ether is slowly added a solution of 10.0 g (0.056 mole) of 1,1,1-trichloropropane-2,3-diol in 60 ml of ether. After the addition is complete, the reaction mixture is stirred at reflux temperatures for 3 hours, cooled, evaporated in vacuo and extracted three times with 50 ml of hot benzene. Evaporation of the combined benzene extracts yields the crude product from which the unreacted starting material is removed by extraction with hot carbon tetrachloride. The residue is distilled, b.p. 174°/1.0 mm, and crystallization from benzene yields the pure product, m.p. 66.5°–68.5° C.

Calcd. for $C_4H_6NCl_3O_3$: C, 21.60; H, 2.72; N, 6.29; Cl, 47.81;

Found: 21.40; 2.85; 6.52; 47.24.

EXAMPLE 2

1,1,1-Trichloro-2-hydroxy-3-(N,N-dimethylcarbamyloxy)propane

To a boiling solution of 50 g (0.28 mole) of 1,1,1-trichloropropane-2,3-diol in 80 ml of benzene is added a solution of 26.8 g (0.25 mole) of dimethylcarbamyl chloride in 50 ml of benzene. The reaction mixture is heated at reflux temperature for 4 hours, cooled, washed with water, dried over magnesium sulfate and evaporated in vacuo to yield the crude product. Unreacted starting material is removed by extraction with hot water and recrystallization of the residue from cyclohexane yields the pure compound, m.p. 84.5°–85.5° C.

Calcd for $C_6H_{10}NCl_3O_3$: C, 28.75; H, 4.02; N, 5.59; Cl, 42.47;

Found: 28.58; 4.31; 5.32; 42.50.

EXAMPLE 3

1,1,1-Trichloro-2-hydroxy-3-(N,N-diethylcarbamyloxy)propane

To 2.08 g (0.0154 mole) of diethyl carbamyl chloride in 10 ml of ether are added with stirring 5 g (0.0279 mole) of 1,1,1-trichloropropane-2,3-diol in 30 ml of ether. The resulting solution is heated at reflux temperature for 2 hours, cooled, treated with 10 ml of 10 percent aqueous sodium hydroxide and extracted 3 times with 25 ml portions of water. The organic phase is dried and evaporated to dryness in vacuo. The residual oil solidifies upon standing and is recrystallized from carbon tetrachloride to yield the pure product, m.p. 96°–98° C.

Calcd for $C_8H_{14}NCl_3O_3$: C, 34.50; H, 5.00; N, 5.03; Cl, 38.17;

Found: 34,50; 5.20; 4.95; 38.21.

EXAMPLE 4

Erythro-1,1,1-trichloro-2-hydroxy-3-(N,N-diethylcarbamyl)butane

To 8 g (0.0415) of erythro-1,1,1-trichlorobutane-2,3-diol dissolved in 50 ml of dry pyridine are added with stirring, 5.42 g (0.04 mole) of diethylcarbamyl chloride. The reaction mixture is refluxed for an additional 2 ½ hours, cooled to 0° C, acidified with 5N HCl to pH 1 and extracted 3 times with 50 ml portions of chloroform. The chloroform extracts are washed with water, dried and evaporated to dryness in vacuo. High vacuum distillation yields the product, b.p. 107°–115 °/0.1 mm, which solidifies and is recrystallized from hexane, m.p. 56.5°–57.5° C.

Calcd for $C_9H_{16}NCl_3O_3$: C, 36.94; H, 5.51, N, 4.78; Cl, 36.35:

Found: 36.93; 5.43; 4.84; 36.33.

EXAMPLE 5

Erythro-1,1,1-trichloro-2-hydroxy-3-carbamyloxybutane

To a suspension of 3.5 (0.042 mole) of carbamyl chloride in 25 ml of benzene is added over a 10 minute period, a warm (35°) solution of 5 g (0.0259 mole) of erythro-1,1,1-trichlorobutane-2,3-diol in 50 ml of benzene. During the addition the reaction mixture is heated to 60° C. After addition is completed, the reaction mixture is stirred at reflux temperature for an additional 3 hours. The hot solution is filtered and evaporated to dryness. The residue is recrystallized several times from benzene and sublimated in vacuo to yield pure erythro 1,1,1-trichloro-2-hydroxy-3-carbamyloxybutane, m.p. 108°–110.5° C.

Calcd for $C_5H_8NCl_3O_3$: C, 25.40; H, 3.41; N, 5.92; Cl, 44.7;

Found: 25.37; 3,38; 5,67; 44.70.

EXAMPLE 6

Erythro-1,1,1-trichloro-2-hydroxy-3-(N,N-dimethylcarbamyloxy)butane

To a solution of 20.0 g (0.014 mole) of erythro 1,1,1-trichlorobutane-2,3-diol in 45 ml of benzene at 40° are added slowly with stirring, 10.7 g (0.1 mole) of dimethylcarbamyl chloride in 25 ml of benzene. The reaction mixture is refluxed for an additional 12 hours. After cooling, the benzene solution is washed with water, dried and evaporated to dryness in vacuo to yield the crude product, m.p. 100°–106°. Recrystallization of this solid from carbon tetrachloride raises the melting point to 110°–111° C.

Calcd. for $C_7H_{12}NCl_3O_3$: C, 31.78; H, 4.57; N, 5.29; Cl, 40.21;

Found: 31.70; 4.69; 5.25; 40.52.

EXAMPLE 7

Threo 1,1,1-Trichloro-2-hydroxy-3-carbamyloxybutane

To a suspension of 12.7 g (0.16 mole) of carbamyl chloride in 100 ml of benzene is added over 10 minutes to a solution of 17.6 g (0.091 mole) of threo 1,1,1-trichlorobutane-2,3-diol in 60 ml of warm benzene. After the addition is complete, the reaction mixture is stirred at reflux for 3 hours, cooled and filtered. The filtrate is evaporated in vacuo. High vacuum distillation of the residue yields the product, b.p. 135°–150°/0.3 mm, which solidifies and is recrystallized from methylene chloride and sublimated to yield the pure product, m.p. 107°–108.5°.

Calcd. for $C_5H_8NCl_3O_3$: C, 25.40; H, 3.41; N, 5.92; Cl, 44.97;

Found: 25.52; 3.17; 6.20; 44.83.

EXAMPLE 8

1,1,1Trichloro-2,3-dicarbamyloxypropane

To 15 ml of 1.7 M methylmagnesium chloride in ether are added over a 15 minute period, 1.9 g (0.0086 mole) of 1,1,1-trichloro-2-hydroxy-3-carbamyloxypropane in 15 ml of ether. Stirring at reflux is continued for 30 minutes and the reaction mixture is then cooled and 20 ml of a 12.5 percent solution of phosgene in benzene are added. Refluxing is resumed for an additional 30 minutes and ammonia gas is then passed into the cooled reaction mixture for 45 minutes. The solid which forms is removed by filtration and the filtrate is evaporated to dryness. Recrystallization of the residue from benzene-ethanol yields the pure product, m.p. 128°–131° C.

Calcd. for $C_5H_7N_2Cl_3O_4$: C, 22.63; H, 2.66; N, 10.56; Cl, 40.07

Found: 22.46; 2.85; 10.28; 40.23.

In a similar fashion, by utilizing 1,1,1-trichloro-2-hydroxy-3-(N,N-diethylcarbamyloxy)propane in the above procedure there is obtained 1,1,1-trichloro-2-carbamyloxy-3-(N,N-diethylcarbamyloxy)propane.

EXAMPLE 9

Erythro-1,1,1-Trichloro-2,3-dicarbamyloxybutane

To a solution of 10.4 g (0.04 moles) of 1,1,1-trichloro-2-hydroxy-3-carbamyloxybutane in 100 ml of anhydrous ether, cooled in an ice-water bath, are added 25 ml of 1.8 M ethereal methylmagnesium chloride. After the addition is complete, the reaction mixture is heated at reflux for 30 minutes and cooled. 35 milliliters of a 12.5 percent solution of phosgene in benzene are added with stirring and the reaction mixture is then stirred, at reflux for 30 minutes and at room temperature for an additional 15 minutes. Though the cooled solution is bubbled anhydrous ammonia. The resulting solid is separated, suspended in water and extracted 3 times with 150 portions of ether. The combined extracts are dried over magnesium sulfate, filtered and evaporated in vacuo to yield a white solid. Recrystallization from chloroform yields the pure product, m.p. 198.5°–200.5°.

Calcd. for $C_6H_9N_2Cl_3O_4$: C, 25.78; H, 3.25; N, 10.02; Cl, 38.06;

Found: 25.89; 3.10; 9.83; 37.73.

Similarly from erythro 1,1,1-trichloro-2-hydroxy-3-(N,N-dimethylcarbamyloxy)butane there is obtained erythro 1,1,1-trichloro-2-carbamyloxy-3-(N,N-dimethylcarbamyloxy)-butane.

EXAMPLE 10

Threo-1,1,1-trichloro-2,3-dicarbamyloxybutane

To a solution of 3.0 g (0.01 moles) of threo-1,1,1-trichloro-2-hydroxy-3-carbamyloxybutane in 30 ml of anhydrous ether, cooled in an ice-water bath, are added 7.2 ml of 1.8 M ethereal methylmagnesium chloride. After the addition is complete the reaction mixture is stirred at reflux temperature for 30 minutes and cooled and 10.1 ml of a 12.5 percent solution of phosgene in benzene are added. After this addition is complete, the reaction mixture is stirred at reflux temperature for 30 minutes and then at room temperature for an additional 15 minutes. It is cooled and anhydrous ammonia is next bubbled into the reaction vessel. The reaction mixture is then suspended in 50 ml of water and extracted 4 times with 50 ml portions of ether. The combined extracts are dried over magnesium sulfate, filtered and evaporated to dryness to yield the product which is recrystallized from 500 ml of chloroform, m.p. 200°–202° C.

Calcd. for $C_6H_9N_2Cl_3O_4$: C, 25.78; H, 3.25; N, 10.02; Cl, 38.06;

Found: 25.77; 2.97; 9.99; 38.13.

EXAMPLE 11

| Ingredients | Quantity/Capsule |
|---|---|
| Threo-1,1,1-trichloro-2-hydroxy-3-carbamyloxybutane | 200 mg |
| Corn Starch U.S.P. | 200 mg |

The foregoing ingredients are mixed thoroughly and introduced into a two-piece No. 1 hard gelatin capsule.

EXAMPLE 12

| Ingredients | Quantity/Tablet |
|---|---|
| 1,1,1-trichloro-2-hydroxy-3-(N,N-diethylcarbamyloxy)propane | 250 mg |
| Corn Starch U.S.P. | 130 mg |
| Lactose | 160 mg |
| Cab-O-Sil M-5 | 4 mg |
| Gelatin U.S.P. | 5 mg |
| Magnesium Stearate U.S.P. | 1 mg |

The foregoing ingredients are thoroughly mixed and pressed into tablets suitable for oral administration of 250 mg of active ingredient. The tablets can be scored to permit administration of fractional doses.

What is claimed is:

1. A pharmaceutical composition comprising in unit dosage form a muscle relaxing amount of a compound of the formula

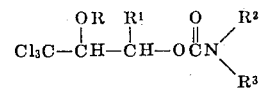

wherein R is hydrogen or the group

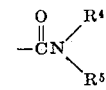

and each of $R^1$, $R^2$, $R^3$, $R^4$ and $R^5$ independent of the other, is hydrogen or (lower)alkyl and a pharmaceutical carrier.

2. The method of effecting muscle relaxation in an animal which comprises administering thereto an effective amount of a composition according to claim 1.

* * * * *